(12) United States Patent
Staver

(10) Patent No.: US 12,046,985 B2
(45) Date of Patent: Jul. 23, 2024

(54) THERMALLY STABLE BYPASS (TSB)

(71) Applicant: Michael Lee Staver, Lanesboro, MN (US)

(72) Inventor: Michael Lee Staver, Lanesboro, MN (US)

(*) Notice: Subject to any disclaimer, the term of this patent is extended or adjusted under 35 U.S.C. 154(b) by 221 days.

(21) Appl. No.: 17/827,682

(22) Filed: May 28, 2022

(65) Prior Publication Data
US 2023/0387776 A1 Nov. 30, 2023

(51) Int. Cl.
*H02M 1/00* (2007.01)
*H02M 3/155* (2006.01)

(52) U.S. Cl.
CPC ......... *H02M 1/0003* (2021.05); *H02M 3/155* (2013.01)

(58) Field of Classification Search
CPC .............................. H02M 1/0003; H02M 3/155
See application file for complete search history.

(56) References Cited

U.S. PATENT DOCUMENTS 4,719,531 A * 1/1988 Okado ................ H03K 17/567
361/91.5
4,731,543 A * 3/1988 Buetemeister ........ F02N 11/087
290/38 R

* cited by examiner

*Primary Examiner* — Harry R Behm

(57) ABSTRACT

A bypass system capable of electrically bypassing a power system is described. The bypass has a voltage input mode to initiate bypass and can be configured to bypass a power system via a connection to a return line/ground. It has a latching feature so it can remain in bypass after the initiating signal has returned to pre-trigger status. Additionally, it can be configured to trigger using any resistive type sensor or sensor with a varying voltage output, and can reset itself to pre-trigger status whenever power is removed from the bypass.

2 Claims, 2 Drawing Sheets

THERMALLY STABLE BYPASS (TSB)

TECHNICAL FIELD

This invention relates generally to bypassing power to a load in a power delivery system. In particular, the present invention relates to bypassing a load in devices such as power supplies, battery chargers, and the like.

BACKGROUND

Voltage regulation (Vreg) circuits contained within power output systems, such as battery chargers, can at times lead to slow charge rates. Bypassing of the voltage regulation system during the initial charging can increase charging rates substantially. Low cost, efficient bypass circuits become valuable tools in such charging instances described herein. The Power output systems contained within U.S. Pat. No. 11,303,126 is referenced and could be improved in certain instances from the Vreg bypass invention disclosed in the current application.

SUMMARY

As an example, charging a lead acid battery that is in a discharged state, using a battery charger with voltage regulation, and using a smaller transformer as a power source for charging, the initial voltage across the battery may be below the voltage regulators cut in point due to the low power output of the small transformer. In this case, the current output would be high being controlled in large part by the battery's demand and design of the transformers windings. However, as the voltage across the battery increases into the voltage regulation cut in point, the current may now be cut by the regulation system, controlling charging output based on voltage. This slows the charge rate before the battery reaches a fully charged state. This issue can be exacerbated if the charger internally senses temperature for temperature compensation, due to high heat created by the initial high charging rate. This can cause voltage regulation output to be driven down by the sensing of the heat, further cutting the charging rate. A solution can be found in bypassing the voltage regulator until a predetermined voltage is reached, say 2.4 volts per cell, thereby providing more charge current for a longer duration before entering into voltage regulation, this would likely be decreasing the overall charging time. Additional design characteristics in a voltage regulator bypass circuit can be thermal stability and a low cost automatic "latching/resetting" solution for bypass control. Additionally, again referencing U.S. patent Ser. No. 11/303,126 Voltage Cut In (VCI) circuits described therein can be incorporated herein to aid the "latching/resetting" solution for the current bypass invention and will be described in detail in the appropriate sections below.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION OF THE INVENTION

Figure 1:
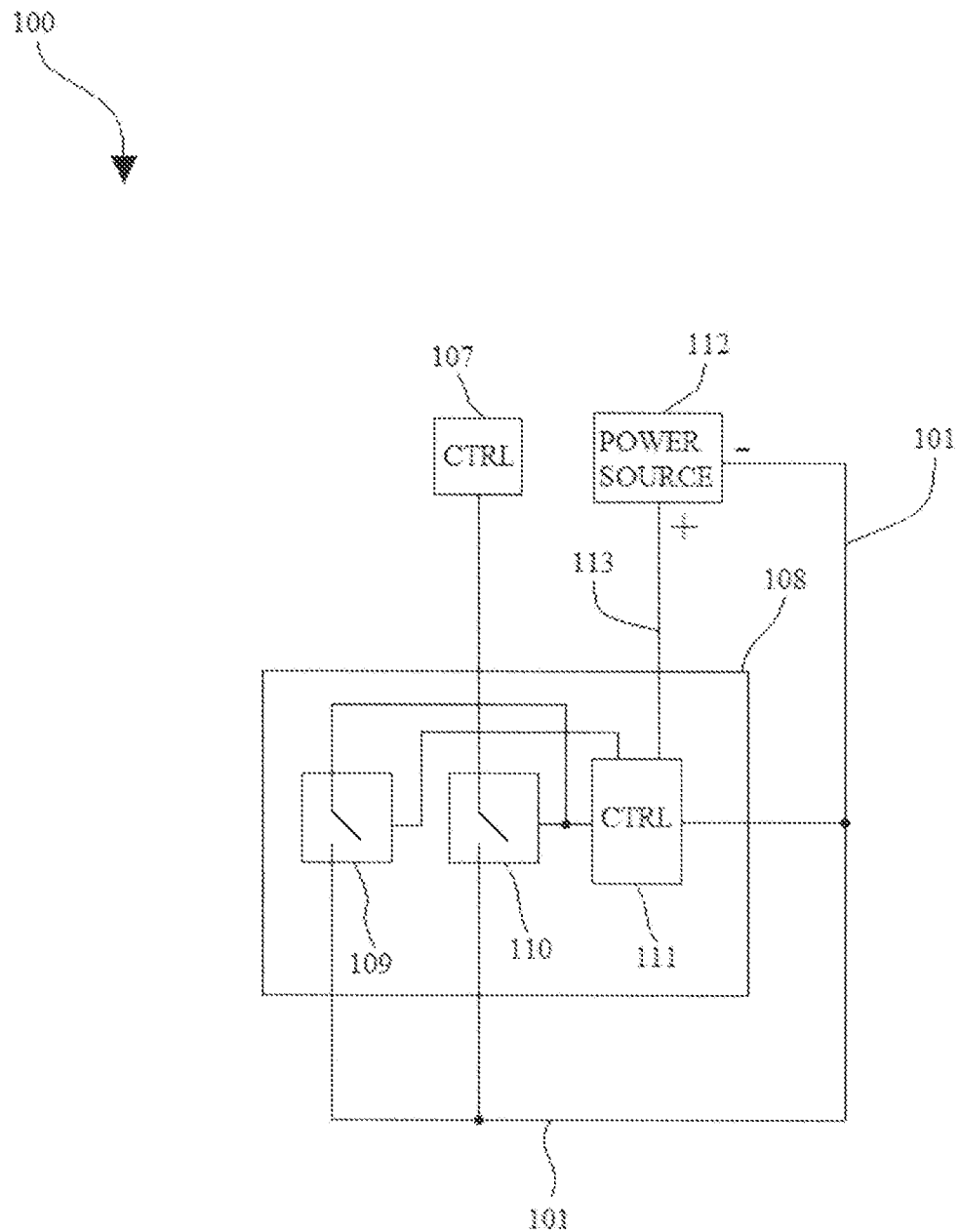
FIG. 1 is a block diagram of an embodiment of a latching bypass circuit.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

As stated earlier, one benefit of bypassing voltage regulation is the possibility of decreasing overall charge time and that the additional design characteristics of temperature stability, latching/resetting, and the concept of adding a bypass to existing systems were introduced. To begin, a detailed description of the core invention will follow.

Referring to FIG. 1, a simplified block diagram of bypass system 100 is shown. Power source 112 may be a battery having a positive voltage supply line 113 and a negative return line/ground 101. The bypass control module 108 contains switch 109, switch 110, and a control 111. Additionally, an external control 107 is shown representing a control capable of a bypass via electrically connecting control 107 to the return line/ground. Switch 110 on its switch contacts is electrically connected to control 107 and to the return line/ground. Switch 109 on its switch contacts is electrically connected to the voltage supply line 113, the control of switch 110, and the return line/ground. Control 111 contains at least a voltage divider and a zener diode. The voltage divider having an input terminal, an output terminal, and a ground terminal is configured to produce a threshold voltage on its output. The input terminal is electrically connected to the voltage supply line 113, the output terminal is electrically connected to the cathode of the zener diode, and the ground terminal is electrically connected to the return line/ground. The anode of the zener diode is electrically connected to the control of switch 109.

A simplified description of operation: in a first aspect, the invention contains two switches. The first switch is configured to bypass control 107 upon connecting to a battery. The second switch is configured to null the bypass of the first switch when a preset voltage is reached. In a second aspect, when used in battery charging with a Vreg bypass, the second switch can "latch" when nullifying so that if the system voltage falls below the preset value no change in the switch state will occur thereby leaving the system in voltage regulation. Additionally, in a third aspect, when the battery chargers battery leads are disconnected, the second switch can change states again and "reset" the system. This would make the charger ready to connect to another battery and the process would begin again.

With battery chargers equipped with voltage regulation being capable of bypassing the voltage regulation to the return line/ground, a typical charging operation could begin by connecting the charge leads to a battery power source 112, and then connecting the charger to a power source example 115 VAC. Using the bypass invention disclosed above, switch 110 would be in conduction bypassing control 107 to the return line/ground. This could bypass the voltage sensing circuit in a voltage regulator. So typically, at start up, this type charger would be in Vreg bypass. Switch 109 would be in the non conductive state. The voltage supply line 113 could begin to see the voltage rise due to the output of the charger; this voltage would be expressed across the voltage divider in control 111 until a threshold voltage on the voltage divider output terminal would be applied to the control of switch 109 causing switch 109 to enter a conductive state thereby bypassing the control of switch 110 to the return line/ground causing charging to continue now in voltage regulation.

Figure 2:
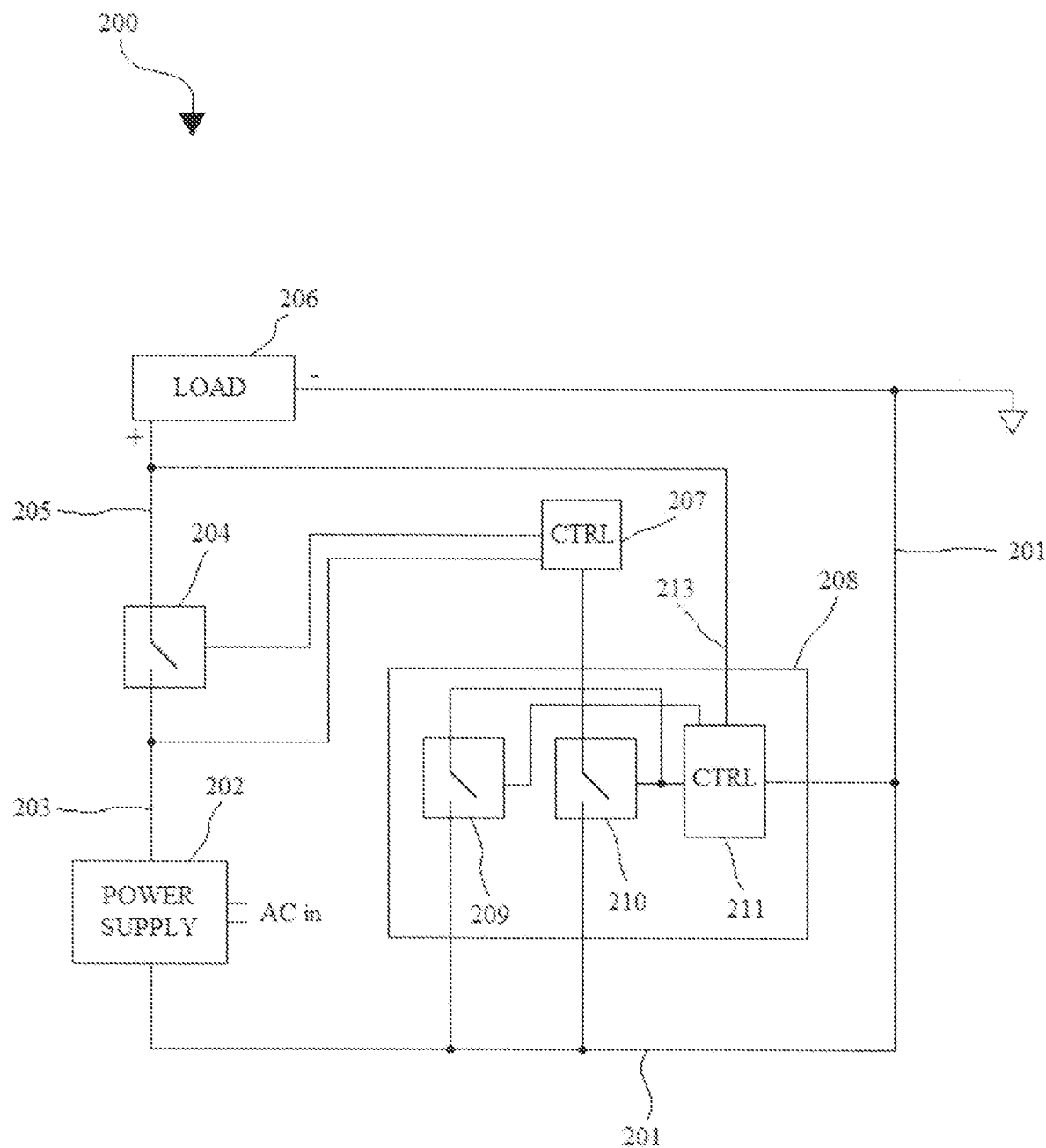
FIG. 2 is a block diagram of an embodiment of a power system containing the latching bypass circuit.

Referring now to FIG. 2 a simplified block diagram of another embodiment showing a basic power output/battery charger system 200 configured with bypass is provided. Power supply 202 contains an electrical transformer and can contain a bridge rectifier. Load 206 can be a rechargeable battery with positive and negative terminals. Power supply 202 transformer output flows through the power supply line 203 to supply switch 204. Power supply 202 is connected to the return line/ground 201. Supply switch 204 is connected to the load/battery 206 positive terminal via the load connection 205. Load/battery 206 negative terminal is connected to the return line/ground 201. The bypass control module 208 contains switch 209, switch 210, and a control 211. Control 211 is electrically connected to the load/battery 206 positive terminal via the voltage supply line 213 and the return line/ground 201. Additionally, an external control 207 is shown representing a control capable of a bypass via electrically connecting control 207 to the return line/ground 201. Switch 210 on its switch contacts is electrically connected to control 207 and to the return line/ground 201. Switch 209 on its switch contacts is electrically connected to the voltage supply line 213, the control of switch 210, and the return line/ground 201. Control 211, contains at least a voltage divider and a zener diode. The voltage divider having an input terminal, an output terminal, and a ground terminal is configured to produce a threshold voltage on its output. The input terminal is electrically connected to the voltage supply line 213, the output terminal is electrically connected to the cathode of the zener diode, and a ground terminal is electrically connected to the return line/ground 201. The anode of the zener diode is electrically connected to the control of switch 209. Bypass control module 208 is configured to work with Vreg/control circuits capable of being bypassed to the return line/ground 201.

Adding optional latching and resetting: if switch 209 was a Silicon Controlled Rectifier (SCR), one with ordinary skill could design the SCR 209 to "latch" and remain conductive until the charger connection to power source 212 was removed thereby causing switch 209 to return to non conductance. However, in the charging system described above, the anode of SCR switch 209 can have voltage applied from the output of power supply 202. The solution could be adding a Voltage Cut In (VCI) circuit (referencing U.S. patent Ser. No. 11/303,126) or equivalent, using a VCI circuit would bypass the battery charger's power supply output to the return line/ground ensuring no voltage would be present at the anode of SCR switch 209 without the charger being connected to the battery.

Connecting the bypass to an existing Vreg control system is described: switch 210 connection to control 207 can be made by electrically connecting the switch contact described to the cathode of the "first zener diode" in Claim 8 of the referenced patent, U.S. patent Ser. No. 11/303,126.

The thermal stability, within the TSB System, can be achieved by zener diode selection contained within control 111/211 above, based also upon its thermal characteristics/thermal coefficients. In many cases a zener diode can be selected to nullify the thermal tendencies of all of the components within its circuit.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A power output system comprising:
a power supply including:
  an electrical transformer;
  a supply line electrically connected to the output of the electrical transformer;
  a return line electrically connected to a ground; and
a control circuit including:
  a supply switch comprising:
    a first silicon controlled rectifier (SCR) including an anode, a cathode, and a gate, wherein the anode of the first SCR is electrically connected to the supply line of the power supply;
    a load connection electrically connected to the cathode of the first SCR;
    a control line electrically connected to the gate of the first SCR and to the supply line of the power supply; and
a bypass circuit including:
  a first switch comprising:
    a metal oxide semiconductor field effect transistor (MOSFET) including a gate, drain, and a source, wherein the drain of the first switch is electrically connected to the control circuit capable of being bypassed via being electrically connected to the return line;
    the source of the first switch is electrically connected to the return line;
    the gate of the first switch is electrically connected to the load connection; and
  a second switch comprising:
    a silicone controlled rectifier (SCR) including an anode, cathode, and a gate, wherein the anode of the second switch is electrically connected to the gate of the first switch;
    the cathode of the second switch is electrically connected to the return line;
    the gate of the second switch is electrically connected to a
  voltage sensing circuit comprising:
  a voltage adjustment circuit including:
    a voltage divider including an input terminal, an output terminal, and a ground terminal, wherein the input terminal is electrically connected to the load connection;
    the ground terminal is electrically connected to the return line; and
    the output terminal is electrically connected to
  a voltage sensor including:
    a Zener diode including an anode and a cathode, wherein the anode of the Zener diode is electrically connected to the gate of the second switch;
    the cathode of the Zener diode is electrically connected to the output of the voltage divider.

2. A power output system comprising:
a power supply including:
  an electrical transformer;
  a supply line electrically connected to the output of the electrical transformer;
  a return line electrically connected to a ground; and
a control circuit including:
  a supply switch comprising:
    a first silicon controlled rectifier (SCR) including an anode, a cathode, and a gate, wherein the anode of the first SCR is electrically connected to the supply line of the power supply;
    a load connection electrically connected to the cathode of the first SCR;
    a control line electrically connected to the gate of the first SCR and to the supply line of the power supply; and
a voltage regulation circuit comprising:
  a second silicon controlled rectifier (SCR) including an anode, a cathode, and a gate; wherein the anode of the second SCR is electrically connected to the control line of the control circuit;
  the cathode of the second SCR is electrically connected to the return line of the power supply; and
  a potentiometer including an input terminal, an output terminal, and a ground terminal;
  wherein the input terminal of the potentiometer is electrically connected to the load connection of the control circuit;
  the ground terminal of the potentiometer is electrically connected to the return line of the power supply; and
  a first Zener diode including an anode and a cathode;
  wherein the anode of the first Zener diode is electrically connected to the gate of the second SCR and through a resistor to the return line of the power supply;
  the cathode of the first Zener diode is electrically connected to the output terminal of the voltage regulation circuit potentiometer; and
a bypass circuit comprising:
  a first switch comprising:
    a metal oxide semiconductor field effect transistor (MOSFET) including a gate, drain, and a source, wherein the drain of the first switch is electrically connected to the cathode of the first Zener diode;
    the source of the first switch is electrically connected to the return line;
    the gate of the first switch is electrically connected to the load connection; and
  a second switch comprising:
    a third silicone controlled rectifier (SCR) including an anode, cathode, and a gate, wherein the anode of the third SCR is electrically connected to the gate of the first switch;
    the cathode of the third SCR is electrically connected to the return line;
    the gate of the third SCR is electrically connected to a
  voltage sensing circuit comprising:
  a voltage adjustment circuit including:
    a voltage divider including a input terminal, an output terminal, and a ground terminal, wherein the input terminal is electrically connected to the load connection;

the ground terminal is electrically connected to the return line;
the output terminal is electrically connected to
a voltage sensor including:
a second Zener diode including an anode, and a cathode, wherein the anode of the second Zener diode is electrically connected to the gate of the third SCR;
the cathode of the second Zener diode is electrically connected to the output of the voltage divider.

* * * * *